Patented Jan. 28, 1930

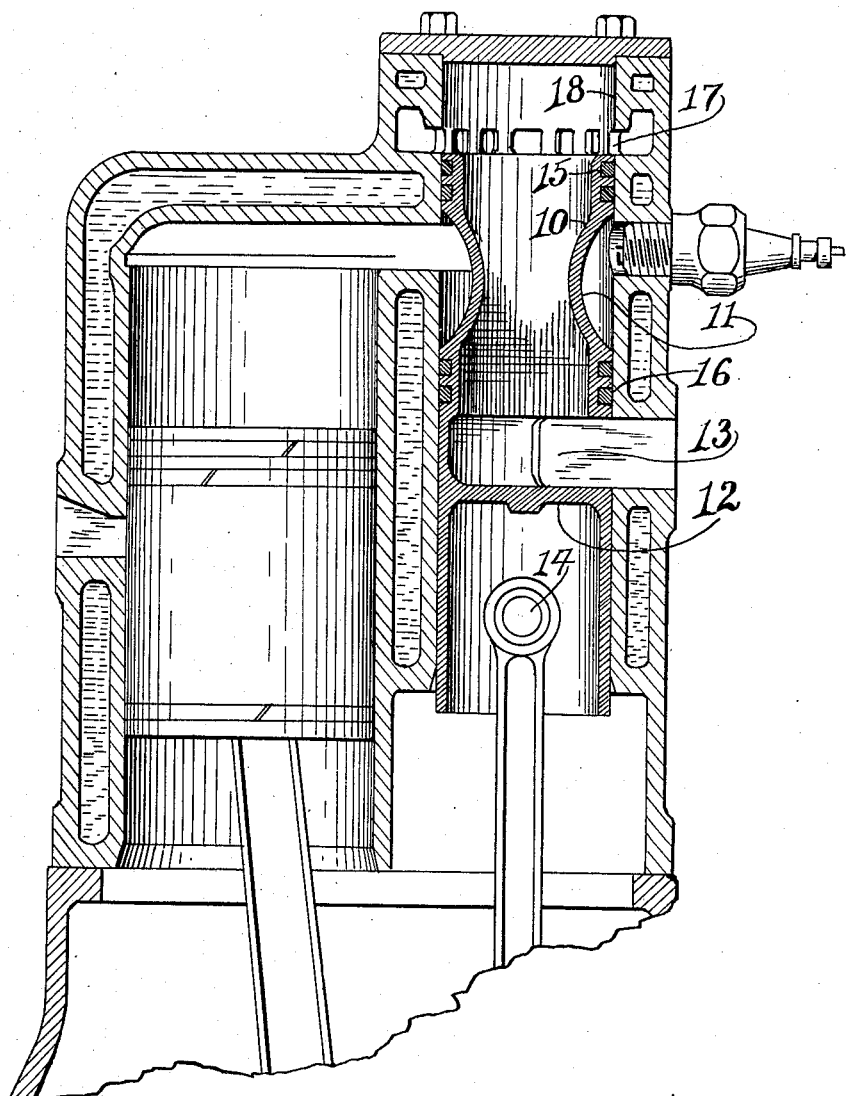

1,745,343

UNITED STATES PATENT OFFICE

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION

INTERNAL-COMBUSTION ENGINE

Application filed May 3, 1926. Serial No. 106,472.

My invention relates to valves for internal combustion engines, and particularly to a valve designed for the combined function of charge inlet to a charge pumping chamber and charge inlet to a combustion chamber.

It has for its principal object the provision of a valve designed for slidable movement within a valve cylinder, with an annular recess formed in its periphery, the said annular recess being adapted to provide a passage communication between the charge pumping cylinder and the combustion chamber with a cross head section formed of the valve dividing it into two cylindrical ends, with provision made in the head end cylindrical form for the fresh charge to be introduced through the valve. The object of introducing the fresh charge through the valve being to provide additional cooling means to the wall of the valve exposed to the heat of combustion and permit the fresh charge supply pipe or device to be attached at a point further crankward on the cylinder block than would be possible were the fresh charge admitted to the head end of the valve cylinder.

In two-stroke cycle internal combustion engines, a charge pump is necessary in any case, when a charge pump of the piston form is employed, a second cylinder being adapted to charge pumping arranged as a functionally related unit adjacent to the combustion cylinder, with the two cranks of the crank shaft to which the piston of the combustion and charge pumping cylinders are connected arranged rotatively, relatively 90° apart to develop super-charging, it occurs that one valve member can be timed in straight reciprocative movement to provide the desirable inlet port opening duration from the source of fresh charge supply to the pumping chamber and the desired transfer port opening duration between the charge pumping cylinder and the combustion chamber, at the correct time relative to the movement of the pistons within the combustion and charge pumping cylinders.

To prevent the pressure of the combustion charge within the combustion chamber from being effective in driving the valve in an opposite direction to the power development rotative movement of the valve drive crank pin, I provide a recess in the periphery of the valve, the chamber of the recess being formed to communicate continuously with the combustion chamber. In combination with this form, I provide a fresh charge inlet passage through the valve, internal of the part formed as a recessed periphery with an inlet port formed through the wall of the valve at a point crankward of the recessed periphery of the valve, the said inlet port being arranged to register passage communication with a source of fresh charge supply.

With the foregoing, and other objects in view, my invention consists in certain novel features of construction that will be hereinafter more fully described and claimed and illustrated in the accompanying drawings in which:

The figure is a vertical section taken through the center of a combustion cylinder and valve cylinder showing the form of my improved valve.

Referring by numerals to the accompanying drawing which illustrate a practical embodiment of my invention, 10 designates a valve, an annular groove 11 is formed in the periphery of the valve, a head 12 is formed of the valve at a point crankward of the annular groove 11. An inlet port 13 is formed through the wall of the cylindrical skirt immediately headward of the head 12; a wrist pin 14 is arranged within the cylindrical skirt crankward of the head 12 to which a driving connection is made with whatever actuating means may be provided for the valve.

Conventional packing rings 15 are arranged in the periphery of the valve headward of the annular groove 11, and conventional packing rings 16 are arranged in the periphery of the valve crankward of the annular groove 11, the packing rings 16 being arranged at a point in the face of the valve between the annular groove 11 and the inlet port 13.

The actuation of the valve in reciprocatory movement headward causes the periphery of the valve headward of the annular groove to uncover the inlet ports 17 to the combustion chamber, which action provides a passage communication between a charge pumping chamber (not shown) and the combustion chamber, and the actuation of the valve crankwardly causes the periphery of the valve headward of the annular groove to cut off the inlet port registration with the combustion chamber and the top edge of the valve to uncover the inlet ports 17 with the bore of the valve cylinder 18. The valve being hollow between the head 12 and the head end with the inlet port 13 formed at the crankward end of the head end cylindrical extension of the valve permits the fresh charge to pass through the valve from the inlet port 13 to the inlet ports 17 formed in the cylinder, providing thereby a fresh charge supply to the charge pumping chamber.

It will be understood that minor changes in the size, form and construction of my improved valve may be made and substituted for those herein shown and described without departing from the spirit of the invention, the scope of which is set forth in the appended claim.

I claim as my invention:

In an internal combustion engine, the combination with a valve cylinder provided adjacent to its upper end with an annular row of inlet ports and also provided adjacent to its lower end with an inlet port of a piston valve arranged for reciprocatory movement within said valve cylinder, said piston valve being open at both ends, a partition within the body of the valve, which divides the space within said body into two chambers, there being an opening in the wall of the valve immediately above said partition, which opening is adapted to register with an inlet port in the lower portion of the cylinder wall, a circumferential groove formed in the outer surface of the body of the valve above said partition and the port in said valve, packing rings seated in the periphery of the valve body above and below said circumferential groove and an ignition device seated in the wall of the valve cylinder and communicating with the annular space formed by the groove in the piston valve.

In testimony whereof, I hereto affix my signature.

EVERETT R. BURTNETT.